United States Patent
Sammarco et al.

(10) Patent No.: US 6,645,616 B1
(45) Date of Patent: Nov. 11, 2003

(54) LAMINATED BOARD FOR ENHANCED GRAPHICS PACKAGING AND STRENGTH

(75) Inventors: Timothy S. Sammarco, Cornwall, NY (US); Thomas Z. Fu, Milford, OH (US); William L. Brown, Mason, OH (US); Alexander A. Koukoulas, Ridgewood, NJ (US)

(73) Assignee: International Paper Company, Tuxedo Park, NY (US)

( * ) Notice: Subject to any disclaimer, the term of this patent is extended or adjusted under 35 U.S.C. 154(b) by 79 days.

(21) Appl. No.: 09/875,253

(22) Filed: Jun. 7, 2001

Related U.S. Application Data

(60) Provisional application No. 60/211,739, filed on Jun. 15, 2000.

(51) Int. Cl.[7] .................. B32B 23/06; B32B 23/08
(52) U.S. Cl. ............... 428/342; 229/5.81; 229/5.82; 229/5.83; 229/5.84; 428/212; 428/219; 428/337; 428/341; 428/512; 428/513; 428/514; 428/534; 428/537.5
(58) Field of Search ............... 428/34.2, 219, 428/212, 337, 341, 342, 512, 513, 514, 537.5, 534; 229/5.81, 5.82, 5.83, 5.84

(56) References Cited

U.S. PATENT DOCUMENTS

| | | | |
|---|---|---|---|
| 4,254,173 A | 3/1981 | Peer, Jr. ...................... | 428/204 |
| 4,661,414 A | 4/1987 | Kowalski .................... | 428/461 |
| 4,898,752 A | 2/1990 | Cavagna et al. ............ | 427/265 |
| 5,038,997 A | 8/1991 | St. Charles ................. | 229/3.1 |
| 5,314,561 A | 5/1994 | Komiya ................. | 156/244.11 |
| 5,458,723 A | 10/1995 | Watkins et al. ............. | 156/310 |
| 5,491,018 A | 2/1996 | Maro et al. ................. | 428/200 |
| 5,882,746 A | 3/1999 | Hoffman ..................... | 428/342 |
| 5,968,636 A | 10/1999 | Sinclair et al. ............. | 428/201 |
| 5,971,266 A | 10/1999 | Sampaolo et al. .......... | 229/137 |

*Primary Examiner*—D. S. Nakarani
(74) *Attorney, Agent, or Firm*—Hoffman, Wasson & Gitler; Michael J. Doyle

(57) ABSTRACT

The invention relates to a laminated board grade structure used for low cost, enhanced graphics packaging. The product contains an unbleached or bleached substrate board and a lightweight coated unprinted white paper grade laminated to the unbleached board substrate to produce a product with a smooth coated, glossy surface for quality graphics printing.

26 Claims, 1 Drawing Sheet

LAMINATED BOARD FOR ENHANCED GRAPHICS PACKAGING AND STRENGTH

Applicant claims the benefit of priority provisional patent application Ser. No. 60/211,739, filed Jun. 15, 2000.

BACKGROUND OF THE INVENTION

The present invention relates to a laminated board product that can be converted into containers for carrying canned or bottled beverages or for various folding carton applications. More particularly, the final product has sufficient wet strength properties for use as the beverage carrier, or carrier board, product mentioned above. The laminate board product is repulpable and recyclable.

U.S. Pat. No. 5,882,746 discloses a laminated paperboard package that is produced by initially printing graphics by high speed printing on a sheet of clay-coated publication paper. The pre-printed paper is then continuously applied to the surface of a cellulosic substrate and bonded to the substrate, preferably through the use of starch as an adhesive, to provide a laminated product. This structure has several disadvantages in that there is no ability to print beverage carrier designs on existing print stations that are set up for printing heavy boards which are characteristic of beverage carriers. In addition, some printing presses are equipped to cut the printed material into cartons in an on-line after printing procedure. A pre-printed paper laminated to a board would require an additional cutting operation for such printing presses. This pre-printed concept is essential to the patent's disclosure and clearly distinguishes same from the subject matter contained herein.

It is an objective of the present invention to produce a final product that has sufficient wet strength properties even though the original paper and/or paperboard components do not have wet strength additives in them.

It is also an objective of the invention to have a structure that allows for lower coat weights on the coated sheet and still allow one to get the desired opacity compared to standard clay coated unbleached grades.

It is a further object of the present invention to produce a laminated board grade that can be used for beverage carriers and/or unbleached or bleached folding carton applications.

SUMMARY OF THE INVENTION

The product produced from the laminated board structure of the present invention, includes as a paperboard substrate, unbleached or bleached board, containing either Kraft, groundwood, thermomechanical (TMP), chemithermomechanical (CTMP), bleached chemithermomechanical (BCTMP), and/or recycled fiber. Laminated to the board substrate is a lightweight coated or uncoated, unprinted, white, paper which, if coated, is coated on one, or two sides. This produces a product with a smooth unprinted surface for high quality graphics post-printing. Lamination can occur either by standard adhesive (aqueous-based, solvent-based, or UV-cured) lamination, pasting methods, use of an extruder, or through a hot melt application system.

DETAILED DESCRIPTION OF THE INVENTION

Figure 1:
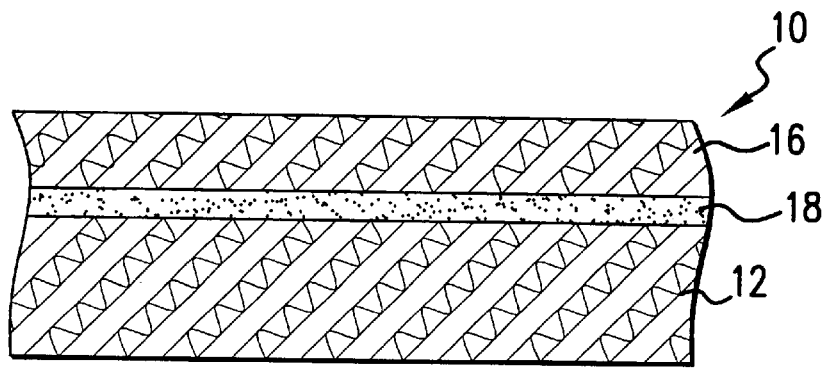
FIG. 1 depicts a cross-section of a preferred embodiment of a laminated board structure embodying the present invention.

FIG. 1 depicts a cross-section of a laminated board structure 10 which comprises a board substrate 12 which is preferably paperboard, either unbleached or bleached, containing either Kraft, groundwood, thermomechanical, chemithermomechanical, bleached chemithermomechanical, and/or recycled fiber. A lightweight coated or uncoated unprinted white paper grade 16 which, if coated, can be coated on one, or two sides, is laminated to the substrate 12 via various methods. Lamination can occur by standard adhesive lamination using an adhesive 18 as depicted in FIG. 1, by pasting methods, by use of an extruder, or by use of a hot melt system. An extruder, hot melt, or UV-cured adhesive system is preferred, since they do not add moisture to the paper components, which tends to induce curl in the final product. Also, extrusion and/or hot melt systems produce a continuous polymer, water barrier film for enhanced wet strength performance. For hot melt lamination, a polymer resin coat weight as low as 1 lb/3,000 ft$^2$ could be used with a sprayed hot melt system. Heavier coat weights ranging from 9 to 35 lbs/3,000 ft$^2$ may be used with a slot die on an extruder/hot melt system to increase caliper and/or final product strength. A chill roll may or may not be used after the two components are laminated together to impart a desired finished appearance. Further, the resin for adhesive, extrusion, or hot melt applications can be biodegradable to make environmentally friendly substrates or containers. The finished laminated board structure has the following properties: Sheffield smoothness of 100–350 Sheffield units (SU) as measured by TAPPI test method T538 om-96, Parker print surface smoothness (TAPPI Test Method T555 om-94) from 1.5–4.0 $\mu$m when measured using a pressure of 10 kgf/cm$^2$, GE brightness of 60–90 (TAPPI test method T452 om-98), 75° gloss of 35–75% (TAPPI test method T480 om-99), and internal bond strength of 70–160×10$^3$ ft.-lbf (TAPPI test method T833 pm-94).

The lamination adhesives can include an aqueous-based adhesive such as ethylene vinyl acetate (EVA) at a solids coat weight of 1–8 lbs./1000 sq. ft., an ultraviolet (UV) light cured adhesive, and an ion-beam cured adhesive (or other electromagnetic radiation cured adhesive) . Also, an EVA-based or UV-cured pressure-sensitive adhesive (PSA) can be used for lamination. Lastly, a chemical fragrant or perfume can be added to the adhesive to impart an attractive odor to the finished carton.

In extrusion or hot melt lamination, an extruded polyethylene layer or a hot melt film comprised of ethylene vinyl acetate (EVA) can be used among others.

The substrate board 12 can vary in thickness depending upon the performance needs of the end use. For example, the thickness may vary from 7 mils for lightweight folding carton applications, to 32 mils for heavyweight carrier board applications, with a basis weight range of 25–96 lbs./1000 sq. ft. The smoothness of the paperboard substrate ranges from 200–400 Sheffield smoothness and less than 12 microns Parker print surface when measured using a pressure of 10 kgf/cm$^2$.

The board substrate 12 does not necessarily need to have wet strength chemicals incorporated into it to achieve a wet strength that is acceptable for carrier board applications as long as the polymer based adhesive is water insoluble once cured. The polymer layer 18 produced by the lamination process offers a barrier to liquid penetration into the sheet and helps bind the structure together. Liquids can weaken the paper 12 and board substrate 12. Additionally, the polymer layer also offers added strength to the end product. For improved opacity and/or whiteness, a whitetop linerboard or a mottled white linerboard can be used for the substrate.

Figure 3:
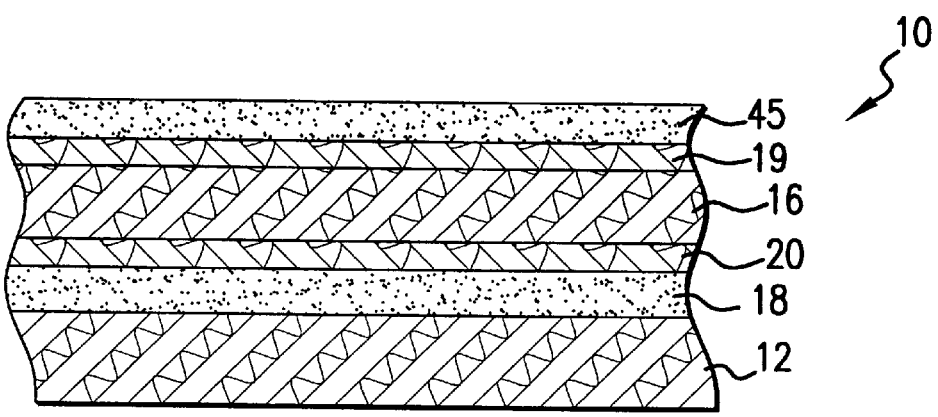
FIG. 3 depicts an alternate preferred embodiment of a cross-section of a laminated board structure embodying the present invention.

The top sheet 16, see FIG. 3, can be uncoated, coated on one side 18, or coated on two sides 19, and 20. The top sheet 16 is bleached and typically has a low basis weight and a low caliper, namely approximately 80 lbs/3,000 ft$^2$ or less, with a preferred embodiment of 40 lbs./3000 sq. ft. or less, and 6.0 mils, or less, with a preferred embodiment of 3.5 mils or less.

The coating 19 on the coated, lightweight unprinted white bleached paper can contain combinations of clay, titanium dioxide, and calcium carbonate to achieve desired smoothness, opacity, and brightness. These coatings produce a Sheffield smoothness less than 100 SU, a Parker print surface less than 2.0 $\mu$m when measured using a pressure of 10 kgf/cm$^2$, a GE brightness of 60–90%, and an unprinted gloss of 35–75% on the unprinted, coated paper. Colored or pearlescent pigments may also be added to add visual appeal for packaging applications. Alternatively, a highly-filled, bleached, uncoated, supercalendered (SC) paper or other uncoated paper grade may be used in place of a coated paper.

Figure 2:
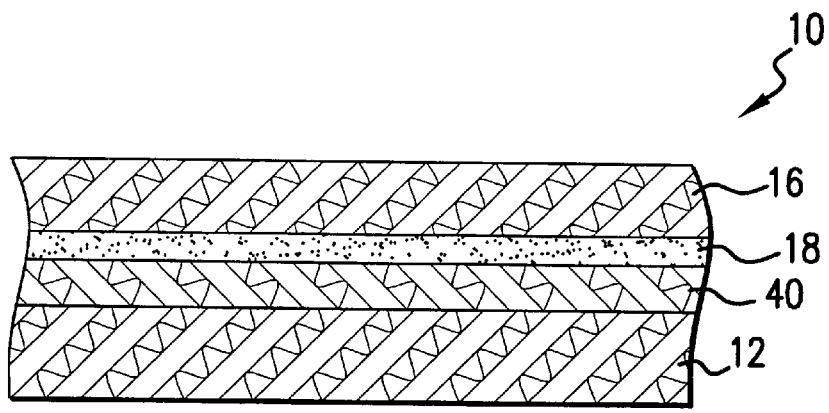
FIG. 2 depicts an alternate embodiment of a cross-section of a laminated board structure embodying the present invention.

As a variation, a pigmented (white or color) opaque polymer film 40 can be coated onto the substrate board 12, see FIG. 2, using an extrusion or hot melt process. The pigment can be titanium dioxide, calcium carbonate, talc, clay, pearlescent pigments, colored pigments or combinations thereof. This will allow the board substrate to achieve a stronger barrier layer against moisture and will improve the tear resistance of the board. Additionally, this polymer coating offers added visual appeal by enhancing whiteness, print gloss, smoothness, and uniqueness. Further, the resin for extrusion or hot melt coating can be reputable and/or biodegradable to make environmentally friendly substrates or containers if so desired. The traditional carrier board is made using wet strength chemicals, which adds cost and makes the product very difficult to repulp and/or recycle.

Lastly, an ink jet coating layer 45 may also be added onto the top surface in order to prepare the laminated or extrusion/hot melt coated product for ink jet printing applications, for packaging. The ink jet coating 45 may be added using standard coating techniques that include, but are not limited to, coating with a gravure cylinder, blade coating, rod coating, curtain coating, or spray coating. This coating step may be done on line during lamination and/or extrusion/hot melt coating operations, or may be done off line as a separate operation. Alternatively, an ink jet media can be laminated onto paperboard by one of the lamination procedures described earlier.

As an alternative, or variation, an uncoated, unprinted, lightweight, white paper could be utilized in place of the unprinted lightweight, coated, white paper. This unprinted, uncoated paper has the following properties: basis weight up to 80 lbs./3000 sq. ft., with a preferred embodiment of 30 lbs./3000 sq. ft. or less, and a thickness of 6.0 mils or less, with a preferred embodiment of 3.5 mils or less. The uncoated sheet could be printed, as is, or could be coated on line during the lamination and/or printing operations, using a gravure cylinder and/or a spray coating method to add a coating or a pre-print varnish. It is important to note that the bleached top sheet is not pre-printed prior to lamination. This is essential to the invention. The adhesive 18 can be either an aqueous based, solvent based, a hot melt, an extruded polymer, or a UV or ion-beam cured adhesive. Further, the resin for adhesive and coating applications can be biodegradable to make environmentally friendly substrates or containers.

As an alternative, the lightweight-coated paper described earlier can also be replaced by a lightweight-coated Bristol board grade with a caliper greater than 6 mils. The Bristol grade is bleached and coated on one or two sides with titanium dioxide, calcium carbonate, talc, clay, pearlescent pigments, colored pigments, or combinations thereof. This coated Bristol grade consists of bleached fibers and has a Sheffield smoothness less than 100 SU and a Parker print surface smoothness less than 2.0 $\mu$m when measured using a pressure of 10 kgf/cm$^2$.

The lamination procedure provides a laminated board structure, which is an economical alternative to current structures in the marketplace. The curl often produced from aqueous based lamination processes or aqueous adhesives can be minimized or eliminated by use of a backside moisturization system (spray or cylinder application). A chemical fragrant or perfume can also be added to the moisturization water to impart an attractive odor to the finished carton.

Alternatively, by using hot melt or extruded adhesives, the curl often produced from aqueous based lamination processes/adhesives can be minimized or eliminated relative to other adhesives such as aqueous adhesives and/or starch based adhesives. Furthermore, heavyweight multi-layered coatings of up to three layers can be eliminated thereby producing a product that is economical. Expensive components such as titanium dioxide are not necessary to produce the particular product, but can be used for enhanced brightness, opacity, and/or visual appeal.

Numerous modifications and variations of the present invention are possible in light of the above teachings. It is therefore to be understood that within the scope of the appended claims, the invention may also be practiced otherwise than as specifically described herein.

What is claimed is:

1. A laminated board structure for enhanced graphics packaging comprising:
   a paperboard substrate; and
   an unprinted coated white paper laminated to the substrate board, wherein the unprinted coated white paper is bleached and has a basis weight of 80 lbs./3000 sq. ft. or less, and a thickness of 6 mils, or less, wherein the board structure yields 70–160 ft-lbf. of internal bond strength.

2. The laminated board structure as claimed in claim 1, wherein the board structure yields a Sheffield smoothness of 100–350 SU and a final Parker print surface smoothness from 1.5–4.0 microns when measured using a pressure of 10 kgf/cm$^2$.

3. The laminated board structure as claimed in claim 1, wherein the board structure yields a GE brightness of 60–90 and a 75° gloss level of 35–75%.

4. The laminated board structure as claimed in claim 1, wherein the unprinted coated white paper is laminated to the substrate board by adhesive lamination, adhesive pasting, extrusion lamination, or by hot melt adhesion.

5. The laminated board structure as claimed in claim 1, wherein the composite structure is laminated using an aqueous based adhesive at a solids coat weight of 1–8 lbs./1000 sq. ft.

6. The laminate board structure as claimed in claim 5, wherein the aqueous based adhesive is ethylene vinyl acetate.

7. The laminated board structure as claimed in claim 1, wherein the composite structure is laminated using ultraviolet cured pressure sensitive adhesive.

8. The laminated board structure as claimed in claim 1, wherein the composite structure is laminated using an ultraviolet light, an ion-beam, or an electromagnetic radiation cured adhesive.

9. The laminated board structure as claimed in claim 1, wherein the composite structure is laminated using an extruded polyethylene layer or a hot melt film comprised of ethylene vinyl acetate.

10. The laminated board structure as claimed in claim 1, further comprising a chemical fragrant or perfume added to a laminating adhesive or added by a water mist to a backside of the board structure to impart an attractive odor to a finished carton.

11. The laminated board structure as claimed in claim 1, wherein the unprinted coated white paper is coated on one or two sides.

12. The laminated board structure as claimed in claim 1, wherein the unprinted white paper is an unprinted, uncoated, supercalendered grade of paper.

13. The laminated board structure as claimed in claim 1, wherein the paperboard substrate has a thickness ranging from 7 to 32 mils and a basis weight range of 25–96 lbs./1000 sq. ft.

14. The laminated board structure as claimed in claim 1, wherein the paperboard substrate is a multi-ply white top linerboard or a mottled white linerboard for improved opacity and/or whiteness in the final laminated structure.

15. The laminated board structure as claimed in claim 1, wherein the unprinted coated white paper has a Sheffield smoothness less than 100 SU and a Parker print surface smoothness less than 2 microns when measured using a pressure of 10 kgf/cm$^2$.

16. The laminated board structure as claimed in claim 1, wherein the unprinted coated white paper is coated with titanium dioxide, calcium carbonate, clay, or combinations thereof.

17. The laminated board structure as claimed in claim 1, wherein optical brighteners, colored pigments, or pearlescent pigments are added to a coating in the laminated board structure to improve brightness and/or visual appeal of the package.

18. The laminated board structure as claimed in claim 1, further comprising a pigmented opaque polymer film layer coated directly onto the paperboard substrate by extrusion or by hot melt application.

19. The laminated board structure as claimed in claim 18, wherein the polymer coating layer is repulpable and/or biodegradable for improved recycling or environmental degradation.

20. The laminated board structure as claimed in claim 18, wherein the pigmented opaque polymer film layer is pigmented by titanium dioxide, calcium carbonate, talc, clay, pearlescent pigments, colored pigments or combinations thereof.

21. The laminated board substrate as claimed in claim 18, wherein a coat weight of the pigmented opaque polymer film layer applied by extrusion ranges from 9–35 lbs./3,000 sq. ft.

22. The laminated board substrate as claimed in claim 18, wherein a coat weight of the hot melt applied pigmented opaque polymer film layer ranges from 3–10 lbs./3,000 sq. ft.

23. The laminated board structure as claimed in claim 1, wherein an ink jet coating layer is added to the unprinted coated white paper to facilitate ink jet printing applications.

24. The laminated board structure as claimed in claim 1, wherein the paperboard substrate is bleached or unbleached.

25. A laminated board structure for enhanced graphics packaging comprising:

a paperboard substrate; and an unprinted coated white paper laminated to the substrate board, wherein the unprinted coated white paper is bleached and has a basis weight of 80 lbs./3000 sq. ft. or less, and a thickness of 6 mils, or less, wherein the paperboard substrate has a Sheffield smoothness of 200–400 SU and Parker print surface smoothness of less than 12 microns when measured using a pressure of 10 kgf/cm$^2$.

26. A laminated board structure for enhanced graphics packaging comprising:

a paperboard substrate; and an unprinted coated white paper laminated to the substrate board, wherein the unprinted coated white paper is bleached and has a basis weight of 80 lbs./3000 sq. ft. or less, and a thickness of 6 mils, or less wherein the unprinted coated white paper has a GE brightness of 60–90% and an unprinted gloss of 35–75%.

* * * * *